(12) United States Patent
Patberg

(10) Patent No.: US 7,703,207 B2
(45) Date of Patent: Apr. 27, 2010

(54) BLANK, CHASSIS COMPONENT AND METHOD FOR PRODUCTION OF SAID CHASSIS COMPONENT

(75) Inventor: Lothar Patberg, Aachen (DE)

(73) Assignee: ThyssenKrupp Stahl AG, Duisburg (DE)

( * ) Notice: Subject to any disclaimer, the term of this patent is extended or adjusted under 35 U.S.C. 154(b) by 1318 days.

(21) Appl. No.: 10/495,238

(22) PCT Filed: Aug. 16, 2002

(86) PCT No.: PCT/EP02/09158

§ 371 (c)(1),
(2), (4) Date: Nov. 23, 2004

(87) PCT Pub. No.: WO03/041978

PCT Pub. Date: May 22, 2003

(65) Prior Publication Data

US 2005/0093333 A1    May 5, 2005

(30) Foreign Application Priority Data

Nov. 10, 2001    (DE)    ............... 101 55 403

(51) Int. Cl.
 *B21D 53/88* (2006.01)
 *B60J 5/00* (2006.01)
(52) U.S. Cl. .................... 29/897.2; 296/146.5

(58) Field of Classification Search .......... 29/897.2, 29/428; 296/146.5
See application file for complete search history.

(56) References Cited

U.S. PATENT DOCUMENTS

| | | | |
|---|---|---|---|
| 4,969,680 A | 11/1990 | Shimoda | |
| 5,536,060 A | 7/1996 | Rashid et al. | |
| 6,038,911 A | 3/2000 | Krajewski et al. | |
| 6,205,714 B1 * | 3/2001 | Staser et al. | ............... 49/502 |
| 6,688,671 B2 * | 2/2004 | Fukutomi | ............... 296/146.6 |
| 2001/0007269 A1 | 7/2001 | Hesch | |

FOREIGN PATENT DOCUMENTS

DE    10001753    7/2001

* cited by examiner

*Primary Examiner*—John C Hong
(74) *Attorney, Agent, or Firm*—Proskauer Rose LLP

(57) ABSTRACT

According to the invention, a blank intended for the production of a sheet panel (11) for a bodywork part of automotive bodywork by cold forming has two deformation sections (2, 4), which consist of highly ductile sheet metal and in the course of cold forming are subjected to a high degree of deformation, and a support section (3), which is arranged between the two deformation sections (2, 4) and is formed from a rigid material, which is subjected in the course of cold forming only to a small degree of deformation and after forming of the blank (1) provides the side crash support of the respective bodywork part. In particular motor vehicle doors (6) can be made from such a blank (1).

15 Claims, 3 Drawing Sheets

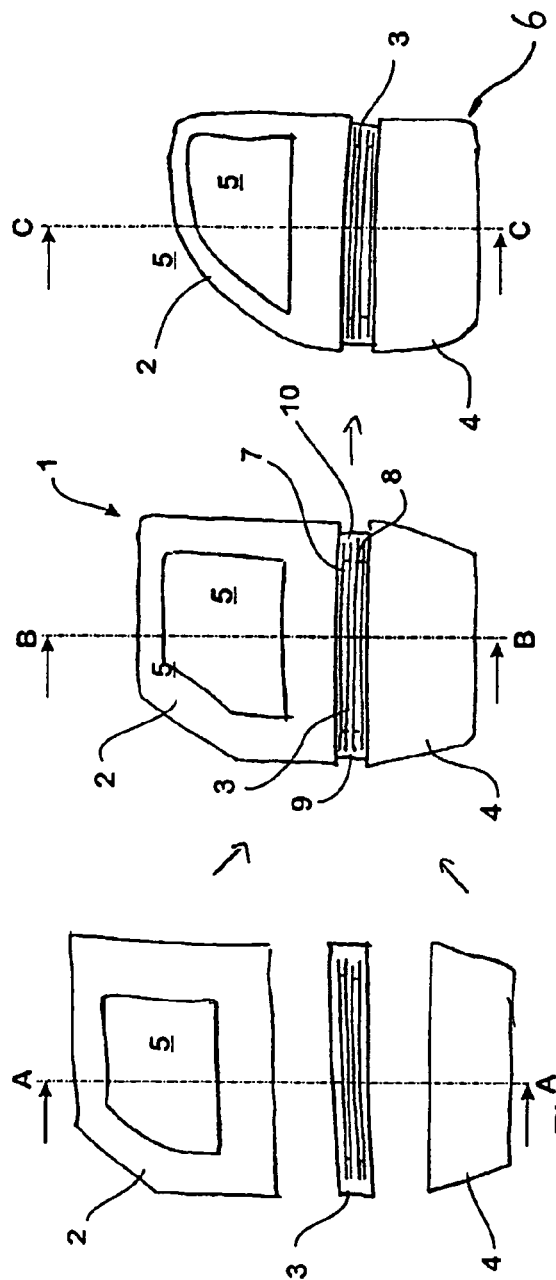

BLANK, CHASSIS COMPONENT AND METHOD FOR PRODUCTION OF SAID CHASSIS COMPONENT

BACKGROUND OF THE INVENTION

The invention relates to a blank for the production of an outer sheet panel for a bodywork part, such a bodywork part, in particular a motor vehicle door, and a method for the production of such a bodywork part.

Increased demands in the protection of the occupants of motor vehicles have led to the side region of the bodywork also being more strongly protected from an impact in the event of a collision with another vehicle or with an object. Usually, so-called "side crash supports" are attached inside the vehicle doors for this purpose.

These supports usually consist of high-tensile steel, which possesses high energy absorbing capacity in the event of an impact. The protection of the vehicle occupants has been substantially improved by using such side crash supports. However, they lead to a considerable increase in the weight of the doors.

The latter is particularly disadvantageous in regard to the generally pursued weight reduction of vehicle bodies. Furthermore, the attachment of the side crash supports makes several production stages necessary, which must be carried out in addition to the other production stages during the fabrication of the bodywork. This usual fabrication of the bodywork comprises the manufacture of the inner and the outer sheet panel of the respective vehicle door in each case by cold forming a sheet metal blank, into which for example the recess needed for the window opening is moulded. Subsequently, the side crash support is attached by bonding or welding to the side of the inner sheet panel assigned to the outer sheet panel. Finally, the outer sheet panel is then placed on the inner sheet panel equipped with the side crash support and both sheet panels are connected together by crimping the boundary regions. In a comparable way, the other outer sheet panels of the bodywork in the vicinity of side bodywork parts enclosing the passenger cell can be strengthened for the event of a lateral impact.

Attempt has been made to improve the strength of motor vehicle doors by forming the outer sheet panel of the vehicle doors with an inside and an outside metal skin (DE 39 34 590 C2). The inside and the outside metal skin in this case can be formed integrally as a pressed sheet part respectively. Further improved impact protection can be achieved by profiling the inner metal skin in the course of its fabrication in such a way that in the impact-endangered region of the doors it forms a side crash support, which then lies against the outer skin. As the result of such a double-skinned structure stiffening of the vehicle doors can be achieved. The expenditure necessary for the production of such doors, however, is substantial. Added to this is the fact that whenever the inner skin also comprises the side crash support, the strength of this side crash support is restricted by the demands, which are imposed with regard to the ductility of the sheet metal used for fabricating the internal skin. Also the expenditure linked with the fabrication of the vehicle doors known from DE 39 34 590 C2 is therefore substantial.

SUMMARY OF THE INVENTION

The object of the invention consists in making possible economical production of outer sheet panels for bodywork parts, in particular motor vehicle doors, which offer good protection for the occupants of a vehicle in the case of a side impact.

This object is achieved according to a first alternative solution by a blank for the production of a sheet panel for a bodywork part of automotive bodywork, in particular for a vehicle door, by cold forming, with two deformation sections, that consist of highly ductile sheet metal and in the course of cold forming are subjected to a high degree of deformation, and with a support section, which is arranged between the two deformation sections and is formed from a rigid, in particular high-tensile material, which is subjected in the course of cold forming to only a small degree of deformation and after forming of the blank, provides the side crash support of the respective bodywork part.

Following the same thought a second solution for the object detailed above involves a vehicle door, which has at least one sheet panel, that has an upper section formed from thin-walled sheet metal material, a support section rigidly connected to the upper section and extending over the width of the door, which is formed from a rigid, in particular high-tensile material, as well as a lower section likewise formed from a thinner sheet metal and rigidly connected to the support section.

Finally, a third alternative for the solution of the object detailed above involves a method for fabricating an outer sheet panel for a bodywork part of a motor vehicle, in particular for the fabrication of the outer sheet panel of a vehicle door formed according to the invention, in the case of which a blank is formed by attaching a deformation section, which consists of a highly ductile sheet metal on each of the longitudinal sides of a support section formed from a rigid sheet metal material, and in the case of which a sheet panel of the bodywork part is cold-formed from the blank.

The common underlying thought of the different variants of the invention is at a suitable place to insert a support section, which fulfills the function of a side crash support, in a blank needed for the fabrication of the respective bodywork part. This support section has increased strength and particularly good energy absorbing capacity and as such is optimized with regard to the object for which it is intended, namely to ensure the protection of the vehicle occupants in the event of a lateral impact. The sheet panel sections attached to the support section on the other hand can be designed in regard to their material properties and configuration in such a way that they can be optimally cold-formed respectively into the desired bodywork form.

The blank likewise prepared according to the invention for the production of a bodywork part formed according to the invention is formed for this purpose in the way of a so-called "tailored blank" from sheet metal sections, which each have different material properties. In this way, the behaviour of the blank material and its property distribution can be matched both with the different demands imposed during fabrication and also with those resulting in the use of the finished formed blank.

Additionally by integrating the support section into the sheet panel concerned the stage up till now always necessary of attaching the side crash support to the respective bodywork part is saved. Furthermore by combining the side crash support with the outer skin of the vehicle the weight, which has had to be taken into account in the case of the conventional fabrication method as the result of attaching a separate support to increase the safety of the vehicle occupants is reduced.

A further advantage of the invention results from the fact that the buckling resistance of the sheet panel made according to the invention is improved. This advantage is especially apparent if the panel fabricated according to the invention concerns an outer sheet panel of the bodywork. By directly connecting the support section with the upper and lower sections of the outer sheet panel attached thereto the support section can support the more highly ductile sections of the bodywork part in each case. In this way very thin and accordingly light and highly ductile sheet panels can be employed for the deformation sections connected to the support section. Also, this contributes both to the improved workability and to the minimized weight of bodywork parts produced according to the invention.

Also, as a result of directly connecting the support section to its adjacent sections, which are subjected to a high degree of deformation, the thick-film bonding, which is regularly required for the conventional attachment of a side crash support, is not necessary.

Finally, bodywork parts fabricated from the inventive blanks and/or according to the invention have improved comfort characteristics. Thus, as a consequence of combining the support section with the outer sheet panel of the respective bodywork part according to the invention it can no longer happen that due to vehicle vibration the outer sheet panel knocks against the side crash support. Unpleasant rattling noises are reliably prevented in this way. Likewise, as a result of the elimination of the separately assembled side crash support in the space of the inventive bodywork panel enclosed by the inner and outer panels extra fitting space is available, which if necessary can be used to accommodate fittings serving the additional comfort of the vehicle occupants.

The invention is particularly effective for the production of vehicle doors. Precisely these bodywork components are especially suitable for application of the invention, because they allow the forming conditions to be selected and the support section to be positioned in such a way that the different ductility of the individual sections of the blank, on which the fabrication is based can be used to particular advantage.

In accordance with a first advantageous configuration of the invention, the deformation sections and the support section are integrally connected together, in particular welded with each other. In this way, the individual sections of the blank according to the invention form a rigid composite, which on the one hand can be highly and reliably controlled during fabrication and on the other hand presents a predictable behaviour in the final assembled condition.

The protective efficiency of the support section is determined on the one hand by the characteristics of the material used for its production. Furthermore, its strength and its energy absorbing capacity in the event of a crash can also be controlled by suitable forming. In accordance with one preferred embodiment of the invention therefore the support section is profiled. Thus, for example, it can be fabricated into a form by roll forming or a comparable working process, as a result of which the strength of the support section is reinforced. For this purpose, for example, at least one stiffening corrugation can be moulded into the support section. This stiffening corrugation however preferably does not extend over the entire width of the respective blank. Instead, it is advantageous if the support section at each of its narrow sides has a non-profiled boundary region and the stiffening corrugation extends between these non-profiled boundary regions. In this way areas are available at each lateral end of the support section, where each adjacent sheet panel of the bodywork component can be connected to in a conventional way.

In principle, any materials can be used for embodying the invention, which on the one hand have the necessary forming capacity and on the other hand possess a strength, which meets the demands imposed with regard to the protective efficiency of the support section. In a particularly advantageous way the requirement criteria is met by the material of steel, from which on the one hand deformation sections, which possess outstanding ductility can be fabricated, and on the other hand enable support sections to be produced, which possess high rigidity and energy absorbing capacity of the highest level in the event of a crash.

Fundamentally, it is also possible if a profiled support section is used to conceal the unevenness associated with the profiling on the outwardly facing surface of the sheet panel of a vehicle door according to the invention by a suitable surface coating. This expenditure can be avoided in accordance with a particularly practical configuration of the invention by concealing the support section with a protective strip on its exterior outward-lying in the assembled condition.

It is particularly advantageous if the support section is essentially not subjected to any deformation during cold forming of the blank. In this way, account is taken of the fact that the ductility of the support section diminishes with increasing strength. Awareness of this circumstance therefore makes it possible to use particularly rigid materials for the support section, which guarantee particularly good protection for the occupants of the vehicle.

BRIEF DESCRIPTION OF THE DRAWINGS

The invention is described in more detail below on the basis of a drawing illustrating one embodiment. There is shown diagrammatically:

FIG. 1a the sheet panel sections still separate from each other when fabricating a blank for the production of a vehicle door in the non-deformed condition in frontal view, FIG. 1b the sections illustrated in FIG. 1a in a profile along the line A-A drawn in FIG. 1a;

FIG. 2a a blank in frontal view, formed from the sections illustrated in FIG. 1a;

FIG. 2b the blank illustrated in FIG. 2a in a profile along the line B-B drawn in FIG. 2a;

FIG. 3a an outer sheet panel cold formed from the blank illustrated in FIG. 2a for a vehicle door in frontal view;

FIG. 3b the outer sheet panel illustrated in FIG. 3a in a profile along the line C-C drawn in FIG. 3a;

FIG. 5a a cutout of the blank used for fabrication of the outer sheet panel of the vehicle door illustrated in FIG. 4 in the non-deformed condition, FIG. 5b a cutout of the outer and inner sheet panel of the vehicle door illustrated in FIG. 4 after initial forming of the blank illustrated in FIG. 5a.

DETAILED DESCRIPTION OF THE INVENTION

Figure 4:
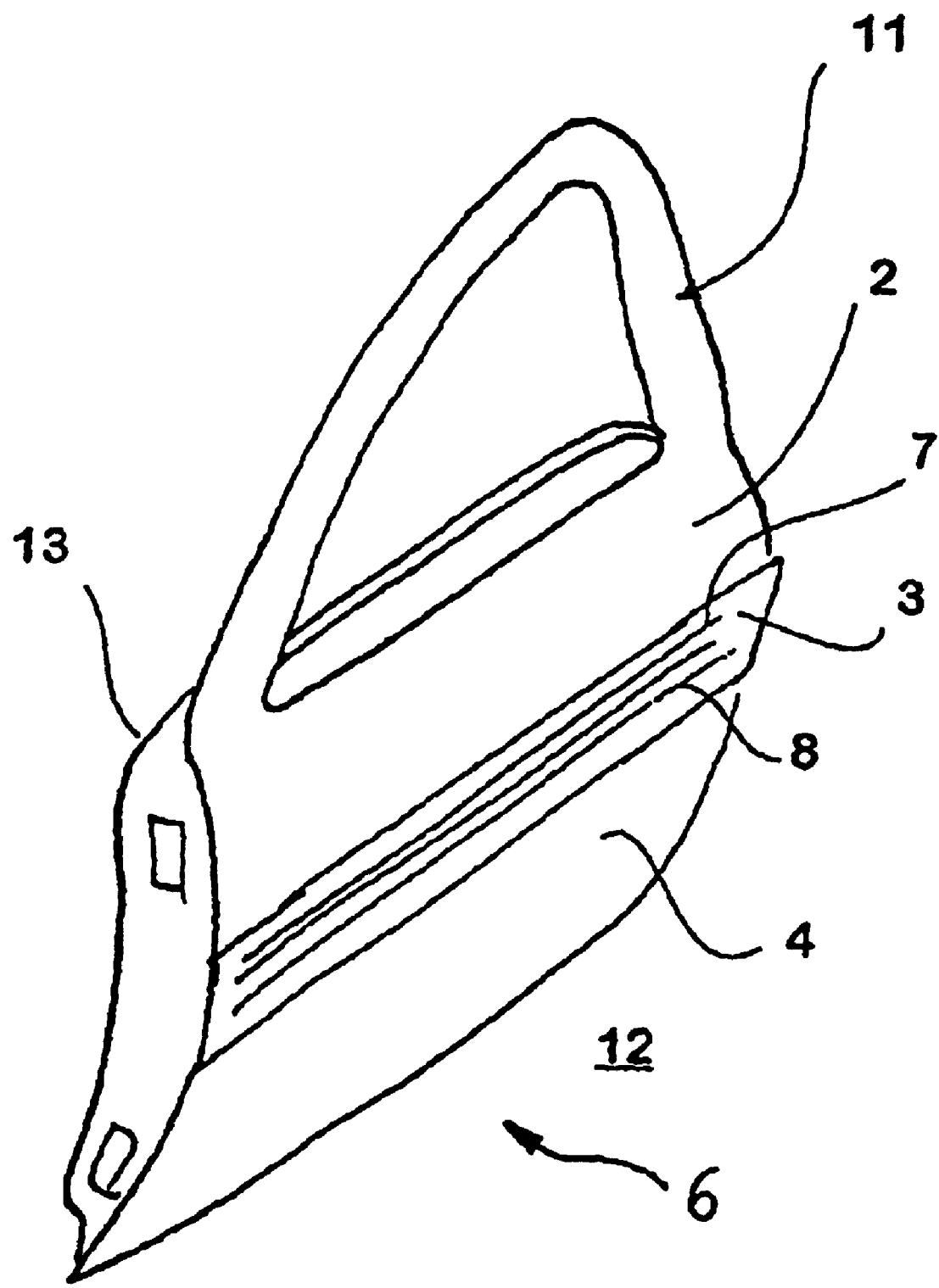
FIG. 4 a vehicle door in perspective view.
Figure 6:
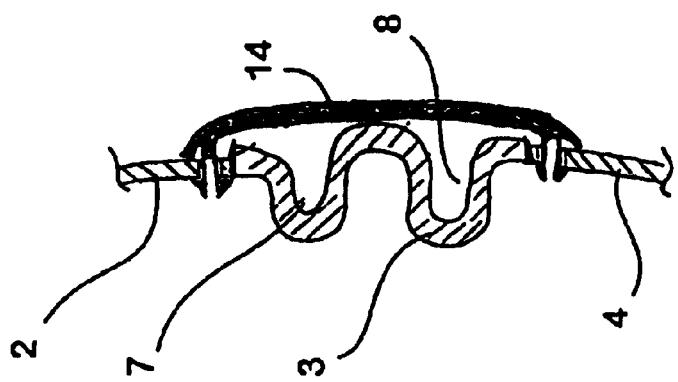
FIG. 6 the outer sheet panel in a profile along the line D-D drawn in FIG. 5c.

The blank 1 illustrated in FIGS. 2a, 2b is fabricated from an upper deformation section 2, a support section 3 attached to the upper deformation section 2 and a second lower deformation section 4 attached to the under side of the support section 3.

The upper deformation section 2 consists of a very thin steel material, which possesses outstanding ductility. In the present embodiment, an opening 5 is moulded into the deformation section 2, which in the final deformed condition of the blank 1 provides the window opening of the outer sheet panel 11 of the finished vehicle doors 6. The upper deformation section 2 is integrally connected to the upper side of the support section 3 for example by laser welding.

The support section 3 consists of high-tensile steel, which possesses high energy absorbing capacity in the event of crash-resultant deformation. It has an elongated, narrow form and extends strip-wise over the width of the vehicle doors 6 being fabricated at the place where in the event of lateral impact the highest forces act with most probability. In the case of a vehicle door intended for a private car the support section 3 is arranged in such a way that it is positioned in the region of the usual height of motor vehicle bumpers.

Figure 5C:
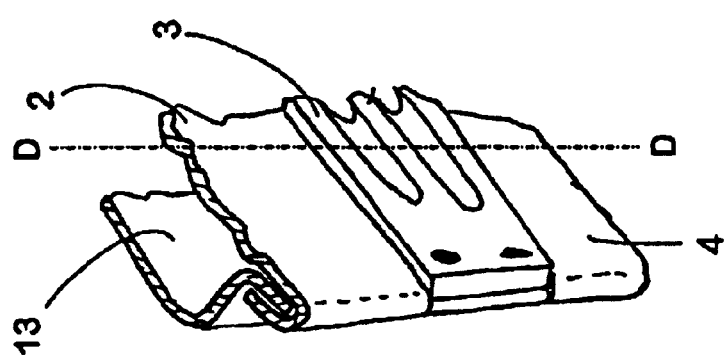
FIG. 5c the cutout of the outer sheet panel of the vehicle door illustrated in FIG. 4 after a further production stage.
Figure 5B:
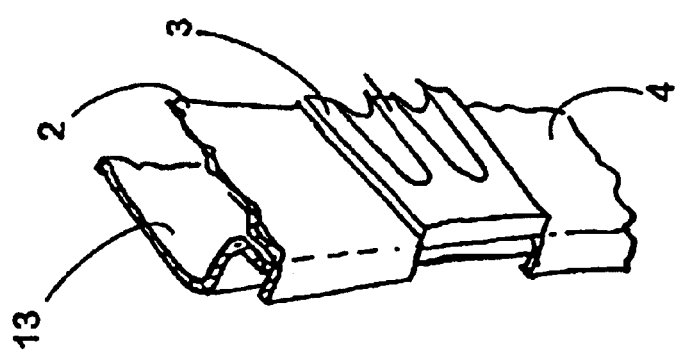
Figure 5A:
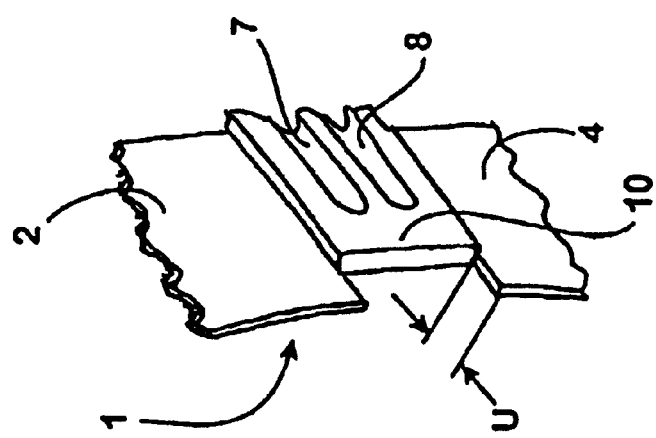

The width of the support section 3 in the present embodiment corresponds to the width of the vehicle doors 6 in the finished state and in the non-deformed condition (FIGS. 2a, 2b; FIG. 5a) is smaller by an under-dimension U than the width of the upper and the lower non-deformed deformation sections 2 and/or 4 attached thereto, so that the deformation sections 2, 4 before final assembly of the vehicle door 6 protrude laterally beyond the ends of the support section 3.

Two stiffening corrugations 7, 8 extending in the width direction of the support section 3 are moulded into the support section 3 parallel to one another by roll forming. The stiffening corrugations 7, 8 thereby each terminate shortly before the lateral edge of the support section 3, seen in the width direction, so that in each case a non-deformed boundary region 9, 10, where the support section 3 of the blank 1 in the non-deformed condition is substantially evenly configured, is present there.

The lower deformation section 4 is welded to the lower edge of the support section 3. Just as the first deformation section 2, it consists of a thin, in particular highly ductile steel material.

The blank 1 fabricated in such a manner is cold formed by means of a press, not illustrated, into an outer sheet panel 11, which has an outwardly curved shape. In this condition, the boundary areas of the deformation sections 2, 4 protruding laterally beyond the support section 3 in the non-deformed condition of the blank 1 are aligned substantially at right-angles to the exterior 12 of the outer sheet panel 11 (FIGS. 3a, 3b and FIG. 5b). The cold forming of the blank 1 in this case is carried out in such a way that the support section 3 remains substantially free of deformation.

The inner sheet panel 13 of the motor vehicle door 6 fabricated in a separate production stage, here not explained further, is laid and braced onto the outer sheet panel 11 fabricated in this way. In this case, the boundary regions 9, 10 free of the stiffening corrugations 7, 8 come into contact with the boundary faces, on which they each lie substantially flat, of the inner sheet panel 13 assigned thereto. Subsequently, the support section 3 is connected to the inner sheet panel 13 by laser welding or another suitable welding method. The free boundary regions of the deformation sections 2, 4 on the other hand are crimped around the edge of the inner sheet panel 13 and welded or bonded together with the inner sheet panel 13 (FIG. 5c).

After the exterior 12 of the outer sheet panel 11 has been painted, the support section 3 is concealed by a protective strip 14, which in the presently known way engages with the outer sheet panel 11 by means of corresponding projections reaching into openings moulded in the outer sheet panel 11.

| REFERENCE NUMERALS | |
|---|---|
| 1 | Blank |
| 2, 4 | Deformation sections |
| 3 | Support section |
| 5 | Opening |
| 6 | Vehicle door |
| 7, 8 | Stiffening corrugations |
| 9, 10 | Non-deformed boundary region |
| 11 | Outer sheet panel |
| 12 | Exterior of the outer sheet panel 11 |
| 13 | Inner sheet panel of the motor vehicle door 6 |
| 14 | Protective strip |
| U | Under-dimension |

The invention claimed is:

1. A blank for the production of a sheet panel for a bodywork part of automotive bodywork by cold forming comprising:

two deformation sections which comprise highly ductile sheet metal and which are subjected in a course of cold forming to a high degree of deformation, and a support section, which is arranged between the two deformation sections and is formed from a rigid material, which is subjected in the course of cold forming to a small degree of deformation and after forming of the blank provides side crash support of the bodywork part.

2. The blank according to claim 1, wherein the deformation sections and the support section are integrally connected together.

3. The blank according to claim 2, wherein the deformation sections and the support section are welded together.

4. The blank according to claim 1, wherein the support section is profiled.

5. The blank according to claim 4, wherein the support section at each of its narrow sides has a non-profiled boundary region.

6. The blank according to claim 1, wherein at least one stiffening corrugation is moulded into the support section.

7. The blank according to claim 1, wherein the deformation sections and the support section are made of steel material.

8. A motor vehicle door, which has at least one sheet panel, comprising:

an upper section formed from a thin-walled sheet metal material, a support section rigidly connected to the upper section and extending over the width of the door, which is formed from a rigid material, and a lower section formed from a thin-walled sheet metal material and rigidly connected to the support section.

9. The motor vehicle door according to claim 8, wherein the upper section comprises a window opening.

10. The motor vehicle door according to claim 8, wherein the support section is concealed on its exterior outwardly lying in the assembled condition by a protective strip.

11. The motor vehicle door according to claim 8, wherein the sheet panel is the outer sheet panel.

12. A method for fabricating a sheet panel for a bodywork part of a motor vehicle according to claim 8, comprising:

forming a blank by attaching a deformation section comprising a highly ductile sheet metal, on each longitudinal side of a support section formed from a rigid sheet material, and cold-forming the sheet panel of the bodywork part from the blank.

13. The method according to claim 12, wherein the support section is integrally connected to the deformation sections.

14. The method according to claim 13, wherein the support section is welded to the deformation sections.

15. The method according to claim 12, wherein the support section is essentially not subjected to any deformation during cold forming of the blank.

* * * * *